United States Patent
Yamamoto et al.

(10) Patent No.: US 6,256,594 B1
(45) Date of Patent: Jul. 3, 2001

(54) MACHINE FAULT MONITORING APPARATUS AND METHOD

(75) Inventors: Shigeru Yamamoto; Kunihiko Imanishi, both of Hirakata; Takao Nagai, Minami-Saitama-gun; Sadachika Akiyama, Yuki; Jiro Akagi, Oyama; Nobuki Hasegawa, Meguro-ku; Kazunori Kuromoto, Yokohama; Taku Murakami, Yamato, all of (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/131,997

(22) Filed: Aug. 11, 1998

(30) Foreign Application Priority Data

Aug. 15, 1997 (JP) .................................................. 9-220440

(51) Int. Cl.[7] .......................... G21C 17/00; G06F 11/30; G01M 17/00
(52) U.S. Cl. .......................... 702/185; 702/184; 702/188; 701/29; 701/35
(58) Field of Search .................................. 702/35, 36, 81, 702/84, 113, 179, 180, 181, 182–186, 187, 188, 33, 34, 42, 43, 56, 75, 114, 115, 122, 141, 145–148, FOR 107, 123–126, 135, 136, 170, 171; 701/29, 34, 35

(56) References Cited

U.S. PATENT DOCUMENTS

| | | | |
|---|---|---|---|
| 4,041,470 | * | 8/1977 | Slane et al. .............................. 701/35 |
| 4,241,403 | * | 12/1980 | Schultz .................................... 701/35 |
| 4,831,539 | * | 5/1989 | Hagenbuch .......................... 701/207 |
| 5,226,153 | * | 7/1993 | DeAngelis et al. ..................... 714/45 |
| 5,400,018 | * | 3/1995 | Scholl et al. ..................... 340/825.54 |
| 5,463,567 | * | 10/1995 | Boen et al. ........................... 702/187 |
| 5,533,193 | * | 7/1996 | Roscoe .................................... 714/39 |
| 5,638,273 | * | 6/1997 | Coiner et al. .......................... 701/35 |
| 6,067,488 | * | 5/2000 | Tano ........................................ 701/35 |

* cited by examiner

Primary Examiner—Patrick Assouad
Assistant Examiner—Manuel L. Barbee
(74) Attorney, Agent, or Firm—Welsh & Katz, Ltd.

(57) ABSTRACT

Only snapshot data necessary for monitoring faults are collected from machine such as vehicles, allowing faults to be more accurately monitored, and the amount of data and the memory storage volume at a monitoring station to be reduced. The values of a plurality of (A), (B), (C), and (D) operating parameters (engine rotational speed, lever operating position, vehicle speed, and tractive force) which change during the operation of the machine are sequentially detected for each machine. The fault detection history data are thus updated every time a fault (drop in engine oil pressure, overheating) is detected during the operation of the machine. Thus, when a fault (drop in engine oil pressure) is detected during the operation of the machine, it is determined on the basis of the history data whether or not to send to the monitoring station the sequential values of the operating parameters ((A) engine rotational speed, (B) lever operating position, (C) vehicle speed, (D) tractive force) from within a prescribed period of time (from 10 min. before to 5 min. after) around the point in time t0 at which the fault was detected. When it is determined that they should be sent, the type of detected fault (0001 (drop in engine oil pressure)), the values detected ((A) 2, (B) 3, (C) 3, (D) 2) at the time the fault was detected, as well as the sequential values of the operating parameters from within a prescribed period of time (from 10 min. before to 5 min. after) around the time the fault was detected are transmitted to the monitoring station. When it is determined that they should not be sent, on the other hand, the type of detected fault (0001 (drop in engine oil pressure)) and the values detected ((A) 2, (B) 3, (C) 3, (D) 2) at the time the fault was detected are sent to the monitoring station.

4 Claims, 5 Drawing Sheets

| DATE OF OCCURRENCE | TYPE OF FAULT | OCCURRENCE STATUS |
|---|---|---|
| OCT. 21, 1996 | 0001 (DROP IN ENGINE OIL PRESSURE) | (A)2 (B)3 (C)2 (D)3 |
| NOV. 15, 1996 | 0001 (DROP IN ENGINE OIL PRESSURE) | (A)2 (B)3 (C)2 (D)3 |
| DEC. 20, 1996 | 0003 (OVERHEATING) | (A)3 (B)1 (C)1 (D)3 |
| | | |

FIG.3

(A) ENGINE ROTATIONAL SPEED
- $Ne < Ne_1$ ----- 1
- $Ne_1 \leq Ne \leq Ne_2$ ----- 2
- $Ne > Ne_2$ ----- 3

(B) LEVER OPERATING POSITION
- BLADE UP ----- 1
- BLADE DOWN ----- 2
- BLADE LEFT ----- 3
- BLADE RIGHT ----- 4
- RIPPER UP ----- 5
- RIPPER DOWN ----- 6

(C) VEHICLE SPEED
- $v < v_1$ ----- 1
- $v_1 \leq v \leq v_2$ ----- 2
- $v > v_2$ ----- 3

(D) TRACTIVE FORCE
- $W < W_1$ ----- 1
- $W_1 \leq W \leq W_2$ ----- 2
- $W > W_2$ ----- 3

FIG.4

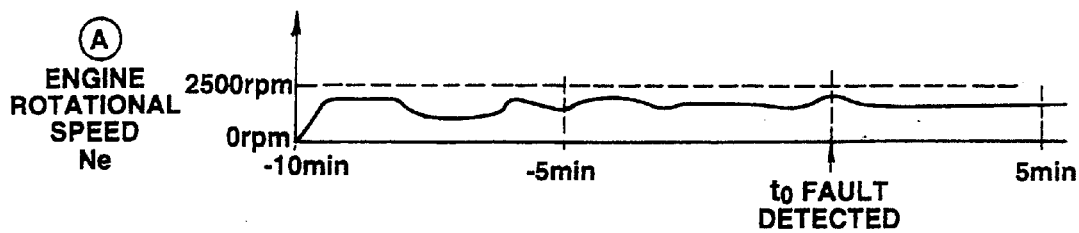
FIG.5
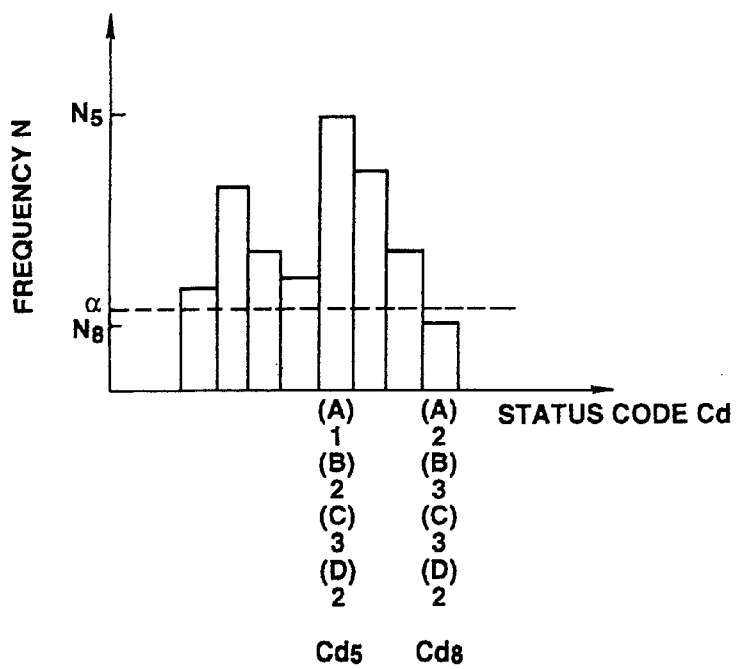
FIG.6
FIG.7

MACHINE FAULT MONITORING APPARATUS AND METHOD

BACKGROUND OF THE INVENTION

1. Field of the Invention

The present invention relates to an apparatus for monitoring machine faults based on the operating status of machine such as construction machine, and more particularly to an apparatus allowing the amount of data to be reduced when operating status data are collected at a monitoring station to monitor faults based on such data.

2. Description of the Related Art

U.S. Pat. No. 5,400,018 is an example of an invention relating to the surveillance of faults such as drops in vehicle engine oil pressure or overheating based on the operating status of vehicles such as construction machine.

In this document, to monitor vehicle faults, data relating to the operating status from a vehicle are collected at a monitoring station, and a determination is made, on the basis of the collected data, whether or not to deal with the fault by repairing the vehicle, issuing an emergency stop command, or the like.

That is, when a fault such as a drop in engine oil pressure is detected in a vehicle, a fault (drop in engine oil pressure) code is generated, and the fault code is transmitted to a monitoring station. The monitoring station monitors a plurality of vehicles, and stores vehicle history data for each vehicle, such as the type of faults occurring in the past, the frequency of such faults, and the date on which they occurred.

When a fault code is transmitted from a vehicle, it is compared with the aforementioned vehicle history data. When it is determined that the fault code indicates an infrequently occurring fault (drop in engine oil pressure), a snapshot data request command is issued to the corresponding vehicle to conduct a detailed search of the status prevailing at the time the fault occurred so as to send snapshot data from around the time the fault occurred to the monitoring station. In cases where the fault indicated by the fault code is frequently occurring, snapshot data from when this type of fault has occurred will already have been stored at the monitoring station, and no request command is sent to the corresponding vehicle, on the assumption that the data are not significant.

Here, "snapshot data" refers to data from around a prescribed period of time at the time the fault is detected in a vehicle, which are the data of the vehicle operating parameters (engine rotational speed, speed, etc.) relating to the fault (such as a drop in engine oil pressure).

The vehicle receiving the request command transmits snapshot data from around the point in time at which the fault was detected to the monitoring station.

Thus, in conventional inventions, in cases where the same malfunction frequently occurs in the same machine, no snapshot data are requested of the vehicle so as to minimize the accumulation of data in the monitoring station.

In the aforementioned conventional technique, however, it is possible that snapshot data necessary for monitoring faults will be overlooked by the monitoring station because the determination as to whether or not snapshot data are needed is made merely by comparing the vehicle history data in which the type, frequency, date and the like of the fault indicated by the fault code are recorded in time sequence. It is also possible, on the other hand, that snapshot data which are not needed for monitoring faults will be requested.

That is, even though the same type of fault may have occurred frequently in the past, the circumstances under which it occurs vary, and the same fault is not necessarily produced under the same operating circumstances. Thus, even though the same fault may have occurred numerous times in the past under the same operating circumstances without impeding actual operations, the same fault occurring under different operating circumstances can fatally damage the vehicle. When, therefore, the need for snapshot data is determined solely on the basis of the past frequency of the fault, there is a risk that the vehicle could sustain major damage because of the inability to collect scarce snapshot data indicating the potential for fatal damage to the vehicle.

SUMMARY OF THE INVENTION

The invention is intended to solve such problems by transmitting, in addition to a fault code, a status code which indicates the status at the time a fault occurs, from the vehicle to the monitoring station, thereby allowing the monitoring station to make more accurate determinations as to whether or not snapshot data should be requested, allowing only snapshot data necessary for monitoring faults to be collected from the vehicle, and allowing faults to be monitored in a more reliable manner. The present invention is also intended to solve such problems by making it possible to collect only snapshot data necessary for monitoring faults from vehicles, thereby minimizing the amount of data and the memory storage volume in the monitoring station.

The first of the present inventions is a machine fault monitoring apparatus having, for each of a plurality of machines, fault detection means for detecting various faults occurring during the operation of the machines, and a monitoring station for monitoring operating status of the plurality of machines by collecting fault detection data detected by the fault detection means of the plurality of machines, wherein each machine comprises:

operating parameter detection means for sequentially detecting various types of operating parameter values which change during the operation of said machine;

history data update means for updating fault detection history data every time a fault is detected by said fault detection means during the operation of said machine;

determination means for determining, based on said history data, whether or not to transmit to said monitoring station sequential values of the operating parameters within a specified period of time around a point in time at which the fault was detected, in cases where said fault was detected by said fault detection means during the operation of said machine; and transmission means for transmitting to said monitoring station, in cases where it has been determined by said determination means that a transmission should be made, a type of fault that was detected, a value detected by said operating parameter detection means at the point in time at which the fault was detected, as well as the sequential values of said operating parameters within the specified period of time around the point in time at which the fault was detected, and also for transmitting to said monitoring station, in cases where it has been determined by said determination means that no transmission should be made, the type of fault that was detected and the value detected by said operating parameter detection means at the point in time the fault was detected.

In the second of the present inventions, in addition to the structure of the first invention, said monitoring station comprises:

relation data generating means for accumulating the type of faults transmitted from each machine and the various operating parameter values at the time the fault was detected, so as to generate data that relate the types and values of the operating parameters with the fault;

relation determination means for collating said related data with the type of fault transmitted from said machine and the values of the various parameters at the time the fault was detected to determine whether or not the fault is related to the types and values of the operating parameters; and request signal transmission means for transmitting to the machine, in cases where no relation was determined by said relation determination means, a signal requesting that values detected by said operating parameter detection means be transmitted to said monitoring station for a given period of time.

According to the structure of the first invention, as shown in FIG. 4, various operating parameters A, B, C, and D (engine rotational speed, lever operating position, vehicle speed, tractive force), which change during the operation of the machine, are sequentially detected in each machine.

As shown in FIG. 3, the fault detection history data are updated every time a fault (drop in engine oil pressure, overheating) is detected during the operation of the machine.

As shown in FIG. 6, in cases where a fault (drop in engine oil pressure) is detected during the operation of the machine, a determination is made, on the basis of the history data, as to whether or not to send to the monitoring station the sequential values of the operating parameters ((A) engine rotational speed, (B) lever operating position, (C) vehicle speed, and (D) tractive force) in a prescribed period of time (from 10 min. before to 5 min. after) from around the point in time at which the fault was detected.

As shown in FIG. 5, when it is determined that a signal should be sent, the type of detected fault (0001 (drop in engine oil pressure)), the values ((A) 2, (B) 3, (C) 3, and (D) 2) detected at the point in time that the fault was detected, as well as the sequential values of the operating parameters in a prescribed period of time (from 10 min. before to 5 min. after) from around the point in time at which the fault was detected are sent to the monitoring station. When it is determined that no signals should be sent, the type of detected fault (0001 (drop in engine oil pressure)) and the values ((A) 2, (B) 3, (C) 3, and (D) 2) detected at the point in time that the fault was detected are sent to the monitoring station.

In the second invention, as shown in FIG. 7, the type of fault (0001 (drop in engine oil pressure)) sent from each machine and the values (Cd5, Cd8, etc.) of the various operating parameters at the time the fault was detected accumulate in the monitoring station, and data relating the fault (0001 (drop in engine oil pressure)) and the operating parameter type and values (Cd5, Cd8, etc.) are produced.

The type of fault (0001 (drop in engine oil pressure)) sent from the machine and the various parameter values (Cd8) at the time the fault was detected are compared with the relation data to determine whether or not there is any relation between the type of fault (0001 (drop in engine oil pressure)) and the operating parameter type and values (Cd8) (whether or not the number of incidents N is greater than $\alpha$).

When it is determined that there is no relation (when the number of incidents N is no more than $\alpha$), a request signal is sent to the corresponding vehicle to transmit to the monitoring station the values of the operating parameters ((A) engine rotational speed, (B) lever operating position, (C) vehicle speed, and (D) tractive force) detected in a prescribed period of time (from 10 min. before to 5 min. after).

Thus, according to the structure of the first invention, the need for snapshot data is not determined solely on the basis of the fault code from the vehicle indicating the type of fault, as in the past, but the determination is also made with the addition of the operating parameter values ((A) 2, (B) 3, (C) 3, and (D) 2) detected at the point in time at which the fault was detected, so the need for snapshot data can be determined on the basis of not only the frequency with which the fault has occurred, as in the past, but also on the basis of the frequency of the operating status prevailing at the time the fault has occurred, allowing requests to be determined more accurately and allowing only data needed for monitoring faults to be requested from the machines more accurately.

According to the structure of the second invention, data relating the type of fault with the types and values of the operating parameters are produced, and the need for snapshot data is more accurately determined by comparing the data received from the machine with the relation data. In other words, the need for snapshot data is determined not only on the basis of the frequency of the fault, as in the past, but also on the basis of the degree to which the fault is related to the operating status at the time of the fault (the frequency of the operating status or the like), allowing requests to be determined more accurately and allowing only data needed for monitoring faults to be requested from the machines more accurately.

As described above, the first and second inventions make it possible to collect from the vehicles only the snapshot data needed for monitoring faults, to more accurately monitor faults, and to reduce the amount of data and the memory storage volume in the monitoring station.

BRIEF DESCRIPTION OF THE DRAWINGS

FIG. 3 schematically depicts details of vehicle fault history data;

FIG. 4 illustrates status codes;

FIG. 5 illustrates the protocol for data transmitted from a vehicle;

FIG. 6 is a diagram used to describe snapshot data, and is a time chart showing the changes in engine rotational speed over time;

FIG. 7 is a graph depicting the status code distribution; and

DETAILED DESCRIPTION OF THE PREFERRED EMBODIMENTS

Embodiments of the machine fault monitoring apparatus of the present invention are described below with reference to the drawings.

A method for monitoring faults which can occur during the operation of the machine based on the present invention is described first.

The embodiments assume construction machine as the machine, and assume an apparatus for supervising and monitoring overhaul periods and the life of the construction machine, for ensuring that the construction machine is stopped in emergencies when a major fault (malfunction) occurs, and for conducting maintenance (inspections, repairs, etc.) according to the status of the fault occurrence.

Monitoring equipment for bringing this about is constructed in the following manner.

That is, sensors for sensing the various operating parameter values which gradually change during the operation of the machine are suitably disposed in the various parts of construction machine such as bulldozers to monitor the engine oil pressure P, engine rotational speed Ne, lever operating position S, vehicle speed v, tractive force W, engine power (engine output), torque, load exerted on various working devices, stroke of the hydraulic cylinders of various working devices, engine blowby pressure in the oil pressure drive circuit, governor lock position, and the like.

When these sensors are commonly used sensors (such as engine rotational speed sensors) for obtaining control feedback signals when the construction machine is driven and controlled, the existing sensors can be used as such, without installing new sensors for monitoring. New sensors for sensing the operating parameters must be installed to monitor operating parameters that are not normally used (such as blowby pressure) when construction machine is driven and controlled.

The detection signals from these sensors are input to a monitoring controller composed primarily of a CPU, the prescribed processing is executed by the controller, and the processed results are displayed on a display device disposed in a location visible to the operator. Controllers inside the construction machine and a personal computer 21 outside the construction machine may be connected by prescribed communications means to allow the results of the controller processing to be seen at a prescribed external location (display device of the monitoring station 20).

Figure 8:
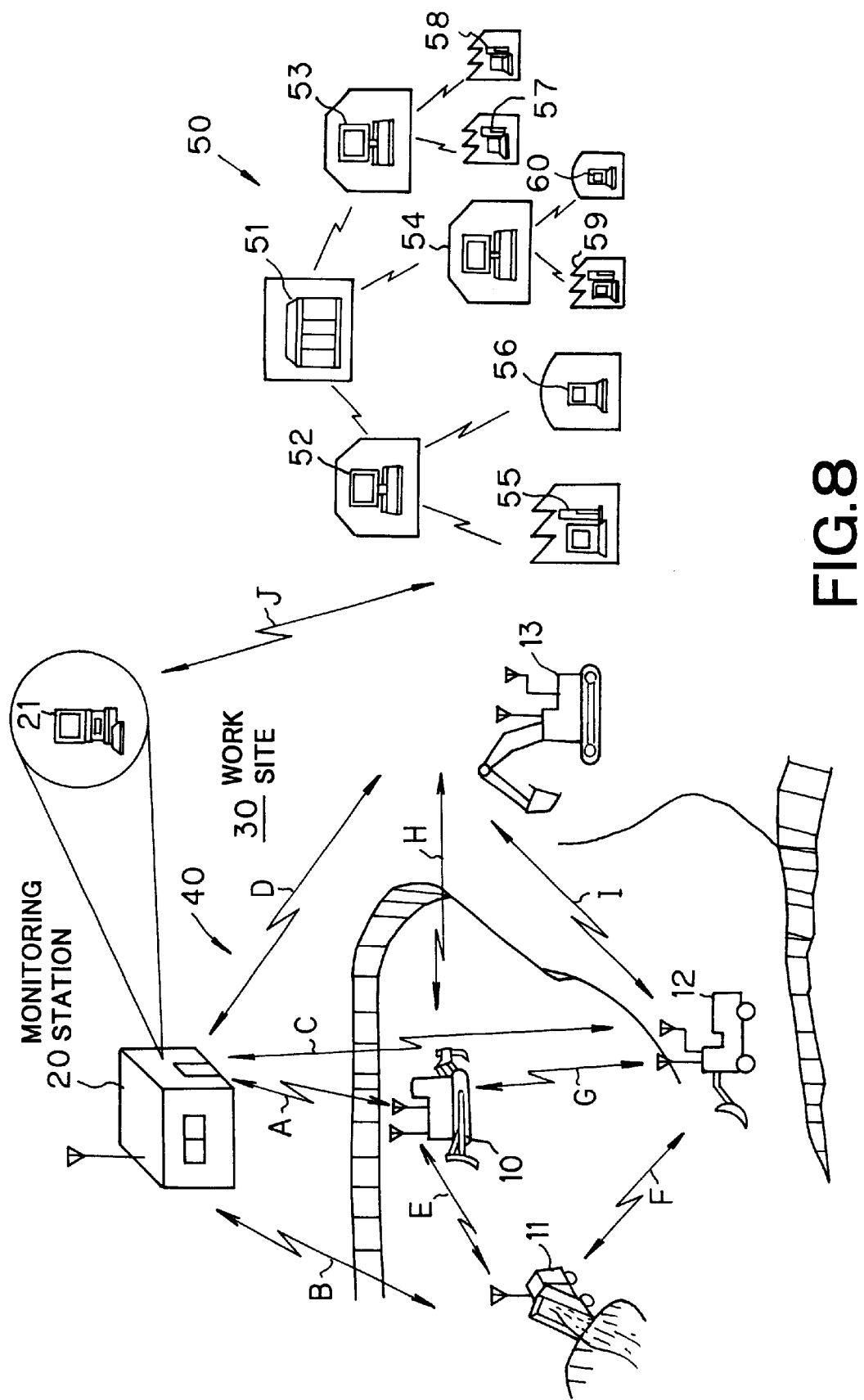
FIG. 8 is a diagram used to describe the communications networks in the embodiments.

FIG. 8 shows communications networks 40 and 50 assumed in the embodiments. The communications networks 40 and 50 are designed to communicate maintenance information for all types of construction machine (such as bulldozers, dump trucks, wheel loaders, and hydraulic shovels) delivered throughout the world, and to provide the maintenance information to individual users.

That is, as shown in FIG. 8, the communications networks 40 and 50 are generally composed of a field net 40, which is a communications network among a work site 30 of individual users of the construction machine, and a global net 50, which is a communications network between construction machine manufacturers, businesses, and plants (parts warehouses, repair plants, and assembly plants) located throughout the world.

The field net 40 comprises a field work site monitoring system in which a number of bulldozers, dump trucks, wheel loaders, and hydraulic shovels (referred to as vehicles for the sake of convenience below) 10, 11, 12, 13, etc. are supervised and monitored by a monitoring station 20 in a mining or other field work site 30. The vehicles in the work site 30 may be manned or unmanned.

In this field work site monitoring system, data indicating the positional relations between vehicles are transmitted and received by means of inter-vehicle communications E, F, G, H, and I, while data indicating travel, stops, or the like from the monitoring station 20 to the plurality of vehicles 10 etc. as well as vehicle data from the plurality of vehicles 10 etc. to the monitoring station 20 are transmitted and received by means of communications between the vehicles and monitoring station A, B, C, and D.

The monitoring station 20 is provided with a computer 21 having the function of comprehensive control over the vehicles in the work site 30.

The global net 50 is composed of a host computer 51 for the comprehensive supervision of maintenance data related to all the construction machine (vehicles) delivered by construction machine manufacturers throughout the world; corporate computers 52 and 53 or subsidiary computer 54, which are subsidiary to the host computer 51; a construction machine assembly plant (repair plant) computer 55 and parts warehouse computer 56, which are subsidiary to the computer 52; construction machine assembly plant (repair plant) computers 57 and 58, which are subsidiary to computer 53; and construction machine assembly plant (repair plant) computer 59 and parts warehouse computer 60, which are subsidiary to computer 54.

Mutual communications J are carried out, for example, between the aforementioned construction machine assembly plant computer 55 and the computer 21 at the work site 30 of the construction machine delivered from the construction machine assembly plant.

The data of the computer 21 at the work site 30 are thus input through communications J and communications in the global net 50 to the host computer 51, and the data of the host computer 51 are input through communications in the global net 50 and communications J to the computer 21 at the work site 30.

The processing executed by these communications networks 40 and 50 is described below with reference to the flow charts depicted in FIGS. 1 and 2.

Figure 1:
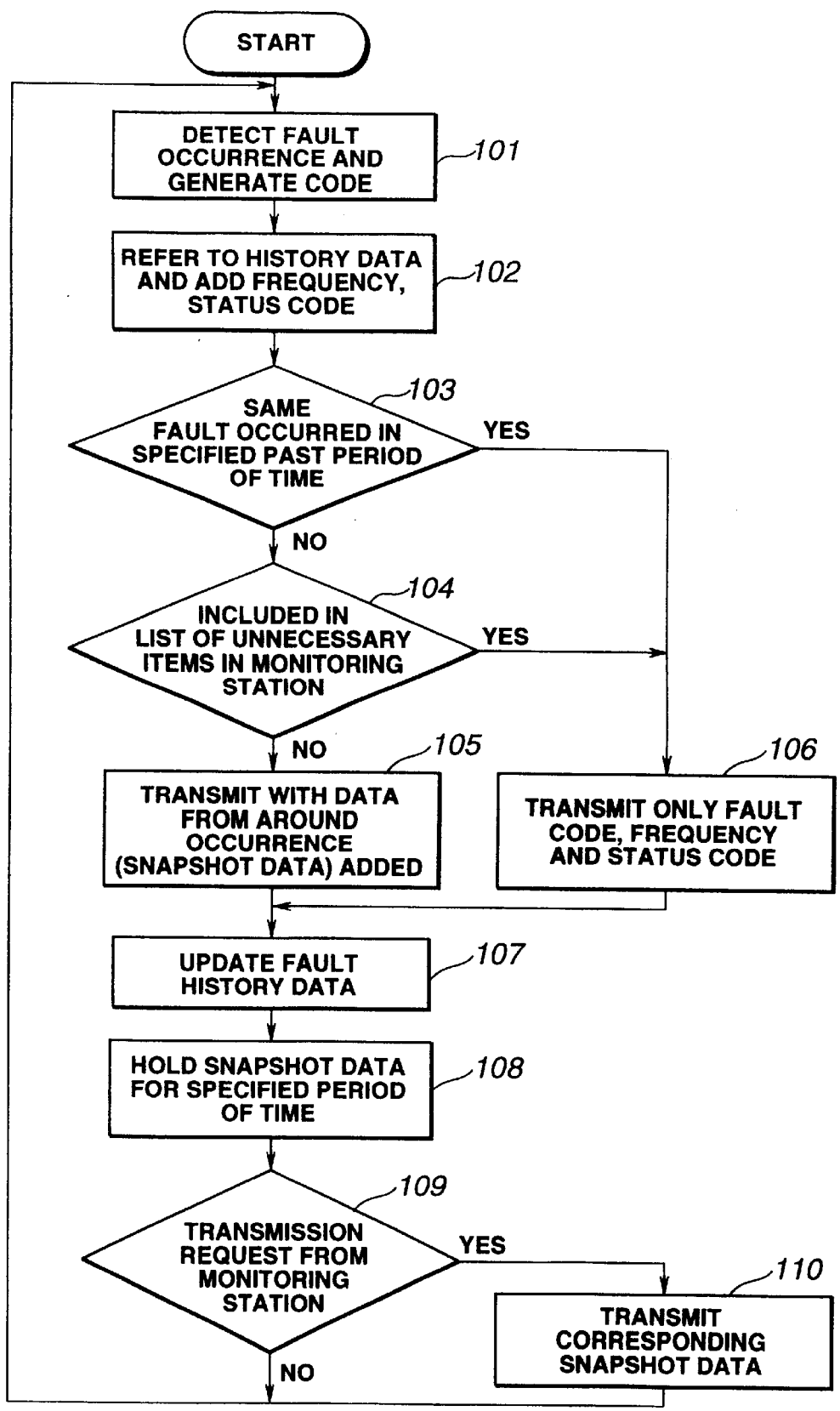
FIG. 1 is a flow chart showing the processing procedure in the embodiments of the machine fault monitoring apparatus and method of the present invention, the details of which are carried out on the vehicle side.
Figure 2:
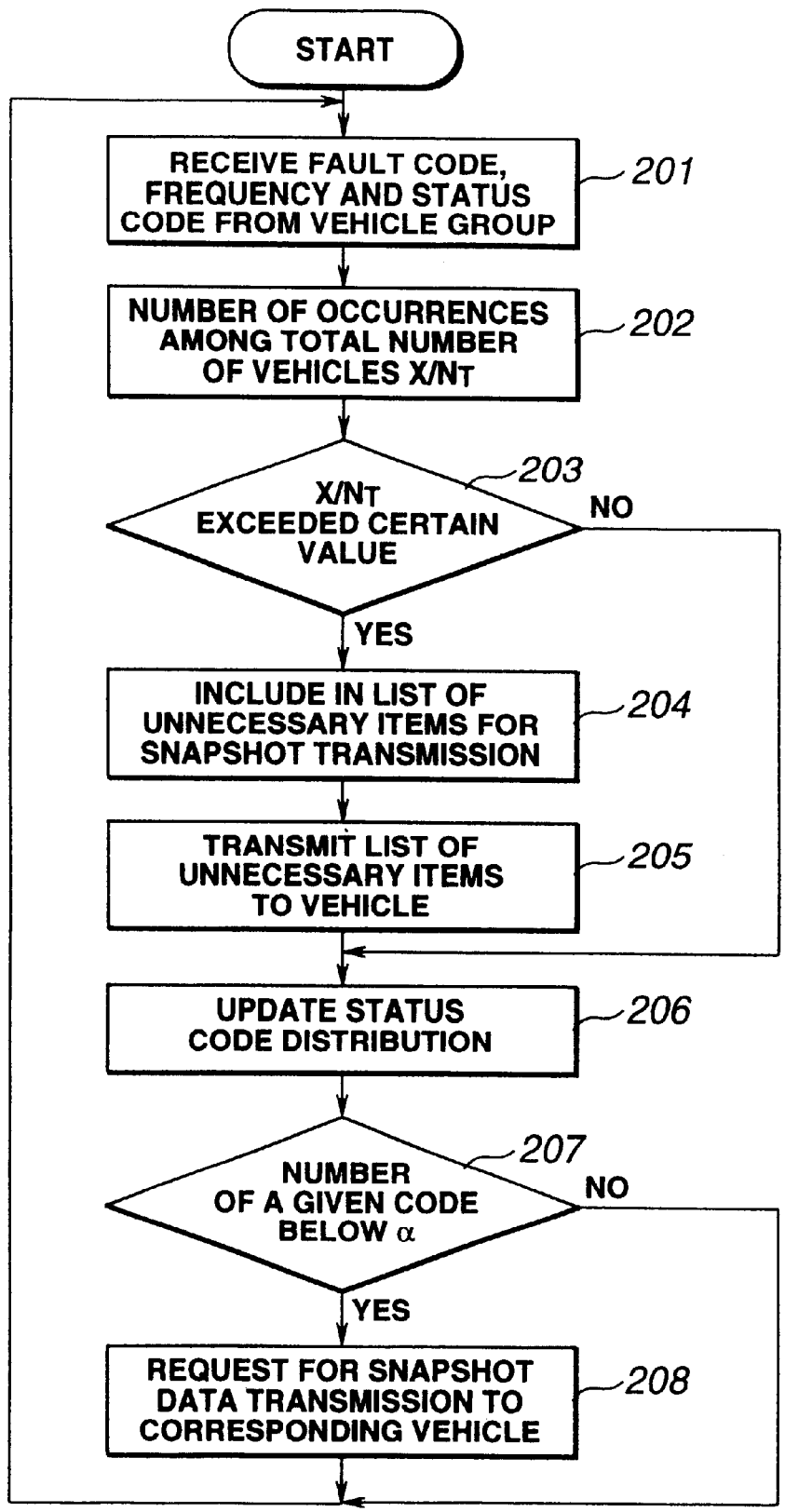
FIG. 2 is a flow chart showing the processing procedure in the embodiments of the machine fault monitoring apparatus and method of the present invention, the details of which are carried out on the computer side.

FIGS. 1 and 2 show the contents of the communications processing executed by the monitoring station 20 between the vehicles 10 etc. and the host computer 51.

FIG. 1 is a flow chart showing the processing procedure executed by the controller for the vehicle 10 such as a bulldozer.

First, in step 101, when a fault is detected in the vehicle 10 during the operation of vehicle 10, a process is executed to generate a fault code indicating the type of fault detected.

That is, the values of a set of operating parameters which gradually change are detected during the operation of the construction machine.

Here, the set of operating parameters is a set of mutually related parameters, consisting of primary parameters and subsidiary parameters.

The following are examples of such sets:

1) engine oil pressure and engine rotational speed, operating lever operating position, vehicle speed, and tractive force;
2) engine rotational speed and torque;
3) load exerted on working devices, and the stroke of the hydraulic cylinders of working devices; and
4) engine blowby pressure, engine rotational speed, and governor lock position.

Here, in the case of the set in 1) above, the engine oil pressure is the primary parameter, and the engine rotational speed, operating lever operating position, vehicle speed, and tractive force are parameters subsidiary to the primary parameter.

It is determined that a fault has occurred when the detected engine oil pressure P, which is the primary parameter, falls below a prescribed threshold for a continuous prescribed period of time, and a fault code ("0001") corresponding to that type of fault (drop in engine oil pressure) is generated (step 101).

Here, fault generation history data are stored in the memory of the controller for the vehicle 10.

As shown in FIG. 3, the fault history data consist of data relating the dates on which a fault occurred and the fault occurrence status with the type of fault, and are compiled in time sequence.

The type of fault is displayed in fault code, such as 0001 (drop in engine oil pressure) or 0003 (over heating), and the fault occurrence status is displayed by symbols for the values of the subsidiary operating parameters at the time the fault occurred. This is referred to as the status code.

Here, the subsidiary parameters of a fault with a fault code of 0001 indicating a drop in engine oil pressure P (primary parameter), as shown in FIG. 4, are the (A) engine rotational speed Ne, (B) operating lever operating position S, (C) vehicle speed v, and (D) tractive force, and the values for these operating parameters (A) engine rotational speed Ne, (B) operating lever operating position S, (C) vehicle speed v, and (D) tractive force are hierarchically divided.

The engine rotational speed Ne is divided into $Ne<Ne1$ (such as 1000 rpm), $Ne1 \leq Ne \leq Ne2$ (such as 1500 rpm), and $Ne>Ne2$. The engine rotational speed Ne is displayed as "1" when it is in the range $Ne<Ne1$, as "2" when it is in the range $Ne1 \leq Ne \leq Ne2$, and as "3" when it is in the range $Ne>Ne2$.

Similarly, the lever operating position S is divided into blade ascending position, blade descending position, blade left tilt position, blade right tilt position, ripper ascending position, and ripper descending position. The lever operating position S is displayed as "1" when it is in the blade ascending position, as "2" when it is in the blade descending position, as "3" when it is in the blade left tilt position, as "4" when it is in the blade right tilt position, as "5" when it is in the ripper ascending position, and as "6" when it is in the ripper descending position. When the operating lever is an electrical lever, the lever operating position S can be detected based on the output of a potentiometer for detecting the operation of the electrical lever.

Similarly, the vehicle speed v is divided in to $v<v1$, $v1 \leq v \leq v2$, and $v>v2$. The vehicle speed v is displayed as "1" when it is in the range $v<vl$, as "2" when it is in the range $v1 \leq v \leq v2$, and as "3" when it is in the range $v>v2$.

Similarly, the tractive force W is divided into $W<W1$, $W1 \leq W \leq W2$, and $W>W2$. The tractive force W is displayed as "1" when it is in the range $W>W1$, as "2" when it is in the range $W1 \leq W \leq W2$, and as "3" when it is in the range $W>W2$.

Thus, in FIG. 3, the status code (A) 2 (B) 3 (C) 2 (D) 3 corresponding to "drop in engine oil pressure" on "Nov. 15, 1996" means that the engine rotational speed Ne was in the range $Ne1 \leq Ne \leq Ne2$, that the lever operating position S was in the blade left tilt position, that the vehicle speed was in the range $v1 \leq v \leq v2$, and that the tractive force W was in the range $W>W2$.

The past frequency (number of occurrences since new vehicle status) of the currently detected fault (drop in engine oil pressure) is searched with reference to the history data, a fault frequency code indicating the frequency of the fault is added to the aforementioned fault code, the values of the subsidiary operating parameters (A) engine rotational speed, (B) lever operation position, (C) vehicle speed, and (D) tractive force at the time the fault was detected are sensed based on the output of each sensor, the status code of these subsidiary parameters is generated based on FIG. 4 from the detected results, and the status code is added to the aforementioned fault code.

For example, when it is sensed from the detected results of the sensors that the engine rotational speed Ne is in the range $Ne1 \leq Ne \leq Ne2$, that the lever operating position S is in the blade left tilt position, that the vehicle speed v is in the range $v>v2$, and that the tractive force W is in the range $W1 \leq W \leq W2$, the status code (A) 2 (B) 3 (C) 3 (D) 2 is generated. When it is found that a fault indicating a drop in engine oil pressure has occurred 7 times in the past, the transmission data that are generated consist of a fault occurrence status code 7 (times) and the status code (A) 2 (B) 3 (C) 3 (D) 2 in addition to the fault code "0001" indicating a drop in engine oil pressure (see step 102 in FIG. 1 and FIG. 5).

There is then a search with reference to the history data to find out whether or not the same fault as the currently detected fault (drop in engine oil pressure) has occurred in a specific period of time in the past (one month, for example) (step 103).

When it is thus discovered that the currently detected fault has not occurred within the past specific period of time, snapshot data of the subsidiary operating parameters around the point in time at which the fault was detected are generally considered useful data for monitoring faults, and the process moves on to the next step 104. In step 104, a determination is made as to whether or not the currently detected fault is included in a list of unnecessary items in the host computer 51. Here, the list of unnecessary items is a list of predetermined faults (predetermined as initial drawbacks) for each vehicle. When faults contained in this list are detected, there is no need to transmit snapshot data for the fault to the monitoring station 20.

When the currently detected fault is not in the list of unnecessary items, snapshot data SD of the subsidiary operating parameters from around the point in time at which the fault was detected are added to the transmission data generated in the aforementioned step 102, and the transmission data are sent to the monitoring station 20 through the communications A between the vehicles and monitoring station.

The snapshot data SD are described here. Using the subsidiary operating parameter (A) engine rotational speed Ne as an example, as shown in FIG. 6, the snapshot data would be the continuous data of the values for the engine rotational speed Ne from 10 minutes before the point in time t0 at which the fault was detected until 5 minutes after the point in time t0 at which the fault was detected. Data from the past 10 minutes of the operating parameters of the vehicle 10 should always be stored in the prescribed memory so as to ensure that such snapshot data SD can be retrieved at the desired time.

The transmission data that are sent to the monitoring station 20 are obtained from a protocol in which, as shown in FIG. 5, first a fault code (0001), then a fault occurrence code (7 times), then a status code ((A) 2 (B) 3 (C) 3 (D) 2), and finally the snapshot data SD are added.

The aforementioned data are sent from the monitoring station 20 through communications J and the communications in the global net 50 to the host computer 51 (step 105).

When it is determined that the currently detected fault has occurred in a specific past period of time (step 103 determination YES) in the aforementioned step 103, or the currently detected fault is included in the list of unnecessary items in the aforementioned step 104 (step 104 determination YES), it is determined that snapshot data corresponding to the detected fault would not be useful, and the transmission data are sent by the monitoring station 20 to the host computer 51 without adding the snapshot data SD.

That is, the transmission data sent by the monitoring station 20 to the host computer 51 are obtained from a protocol in which, as shown in FIG. 5, first a fault code (0001), then a fault occurrence code (7 times), and finally a status code ((A) 2 (B) 3 (C) 3 (D) 2) are added (step 106).

When a fault is thus detected, the contents of the fault history data (FIG. 3) are updated based on data related to the detected fault (fault code, date of occurrence, and status (status code)) (step 107).

When a fault is thus detected, the contents of the snapshot data SD are updated so as to preserve the values of the operating parameters from the present to a fixed period of time (10 minutes) before. The contents of the snap shot data SD are thus sequentially updated to allow faults to be managed using a low memory volume and to ensure the prompt retrieval of snapshot data SD (step 108).

The controller for the vehicle 10 determines whether or not a request command signal for snapshot data SD described below has been input from the monitoring station 20, and when no request command has been input, the procedure moves again to step 101, and the same procedure is repeated (step 109). When a request command for snapshot data SD has been input from the monitoring station 20, snapshot data SD corresponding to the fault detected in step 101 are transmitted to the monitoring station 20 (step 110).

The process on the host computer 51 side until the request command for snapshot data SD is sent is described below with reference to FIG. 2.

As shown in FIG. 2, the host computer 51 receives transmission data in the state shown in FIG. 5 from vehicles in the field work site 30 and from all vehicles delivered throughout the world (step 201).

The host computer 51 searches to find out the percentage of all vehicles throughout the world in which the fault (drop in engine oil pressure) indicated by the transmission data has occurred, based on the contents of the transmission data that have been received, such as the transmission data shown in FIG. 5 sent from vehicle 10.

Specifically, x/NT is calculated, where NT is the number of the same type of vehicles as vehicle 10 which have been delivered, and x is the number of times in the past a drop in engine oil pressure has occurred, including the current fault detection (step 202).

It is then determined whether or not the x/NT calculated in the aforementioned step 202 is greater than a specific threshold value (step 203). When x/NT is greater than the aforementioned threshold value, snapshot data SD corresponding to the currently detected fault (drop in engine oil pressure) are not considered useful data for monitoring faults, and the fault (drop in engine oil pressure) is placed in the list of unnecessary items. Thus, when a fault indicating a drop in engine oil pressure is included in the list of unnecessary items, the determination in step 104 in FIG. 1 is NO even if a fault indicating a drop in engine oil pressure in vehicle 10 is subsequently detected, and there is no need to add the snapshot data SD to the transmission data (step 204).

When a type of fault requiring no snapshot data SD transmission is newly added to the list of unnecessary items, the list of unnecessary items with updated contents is transmitted from the host computer 51 through the communications in the global net 50 and communications J to the monitoring station 20, and is transmitted from the monitoring station 20 through the communications A between vehicles and monitoring station to the vehicle 10 (step 205).

Meanwhile, when it is determined that x/NT is below the aforementioned threshold value in the aforementioned step 203, it is concluded that the snapshot data SD corresponding to the currently detected fault (drop in engine oil pressure) would be useful in monitoring faults, the procedure moves on to step 206, and the process for determining whether or not snapshot data SD should be requested of the vehicle 10 is then carried out.

FIG. 7 shows the distribution of status codes used to determine whether or not snapshot data SD should be requested.

This status code distribution is generated for each type of vehicle and each type of fault occurring in the vehicles.

The status code distribution in FIG. 7 is the status code distribution produced for a fault indicating a drop in engine oil pressure occurring in a bulldozer vehicle (including vehicle 10).

The horizontal axis of the status code distribution is status code Cd, and the vertical axis is the fault (drop in engine oil pressure) frequency N. The frequency N is the number of faults produced in the same type of bulldozer delivered throughout the world.

Here, the contents of the status code Cd indicated in the transmission data for an engine oil pressure drop fault transmitted from vehicle 10, which is a bulldozer, are (A) 2 (B) 3 (C) 3 (D) 2, and since this corresponds to Cd8 on the horizontal axis, the status code distribution is updated so that the frequency N8 corresponding to the status code Cd8 increases +1 (step 206).

A threshold value a by which the magnitude of the frequency N is determined in binary fashion is established for the status code distribution to determine whether or not snapshot data SD should be requested.

For example, the fault frequency is N5 when the status code Cd5 is (A) 1 (B) 2 (C) 3 (D) 2, and since this is greater than the aforementioned threshold value $\alpha$ (step 207 determination NO), there are a great many cases where a fault occurs with a status code Cd5. It is concluded that the snapshot data SD at this time would not be useful data, and it is determined that no snapshot data SD should be requested. The procedure then returns to step 201.

In contrast, the fault frequency is N8 when the status code Cd8 is (A) 2 (B) 3 (C) 3 (D) 2, and since this is below the aforementioned threshold value $\alpha$ (step 207 determination YES), there are very few cases where a fault occurs with a status code Cd8. It is concluded that snapshot data SD at this time would be useful data, and it is determined that snapshot data Sd should be requested. A request command to transmit snapshot data SD from around the time the fault occurred in the vehicle 10 from which the transmission data with the status code Cd8 has been transmitted is sent from the host computer 51 through the communications in the global net 50 and the communications J to the monitoring station 20. The request command is then transmitted from the monitoring station 20 through the communications A between the vehicles and monitoring station to the vehicle 10 (step 208).

When the controller for the vehicle 10 determines that a request command signal for snapshot data SD has been input from the monitoring station 20 in step 109 in FIG. 1, the snapshot data SD is transmitted through the monitoring station 20 to the host computer 51 in step 110.

When transmission data to which snapshot data SD has already been added are received in step 201 in FIG. 2, no process for generating a snapshot data request command is required in steps 207 and 208.

As described above, transmission data in which a status code has been added to a fault code are transmitted to the host computer 51, making it possible to more accurately determine whether or not snapshot data SD should be requested on the vehicle side from the status code distribution based on the status code. Fault history data are prepared on the vehicle side, the fault history data are compared with the currently detected fault, and a determination is made, allowing it to be more accurately determined whether or not snapshot data SD for the fault should be transmitted to the host computer side.

Thus, only snapshot data SD that are necessary for monitoring faults are transmitted to the host computer 51, so that faults can be more accurately monitored on that basis. Furthermore, since only snapshot data SD necessary for monitoring faults are collected, the amount of data and the memory storage volume of the host computer 51 can be kept to the minimum necessary levels.

The present embodiment assumed a case in which snapshot data for vehicles delivered throughout the world the collected in the host computer 51, but the scope of data that are collected can be set to any desired magnitude. For example, the function of the host computer shown in FIG. 2 can be assumed by the computer 21 of the monitoring station 20 used for the comprehensive control of the field work site 30, and the snapshot data SD for the vehicles present in the field work site can be collected in the monitoring station 20 to determine the maintenance periods for the vehicles in the field work site 30 and to issue commands for vehicle emergency stops and the like.

What is claimed is:

1. A machine fault monitoring apparatus having, for each of a plurality of machines, fault detection means for detecting various faults occurring during the operation of the machines, and remote monitoring station for monitoring operating status of the plurality of machines by collecting fault detection data locally detected by the fault detection means of the plurality of machines, wherein each machine comprises:

operating parameter detection means for locally sequentially detecting various types of operating parameter values which change during the operation of said machine;

history data update means locally updating fault detection history data every time a fault is detected by said fault detection means during the operation of said machine;

determination means for locally determining, based on said history data and the value of the fault, whether or not to transmit to said monitoring station sequential values of the operating parameters within a specified period of time around a point in time at which the fault was detected, in cases where said fault was detected by said fault detection means during the operation of said machine;

transmission means for transmitting to said remote monitoring station, in cases where it has been determined locally by said determination means that a transmission should be made, a type of fault that was detected, a value detected by said operating parameter detection means at the point in time at which the fault was detected, as well as the sequential values of said operating parameters within the specified period of time around the point in time at which the fault was detected, and also for transmitting to said remote monitoring station, in cases where it has been determined by said determination means that no transmission should be made, the type of fault that was detected and the value detected by said operating parameter detection means at the point in time the fault was detected.

2. The machine fault monitoring apparatus according to claim 1, wherein said transmission means searches for a frequency of the detected fault based on said history data, and transmits data indicating the fault frequency to said remote monitoring stations.

3. A vehicle fault monitoring apparatus having, for each of a plurality of vehicles, fault detection means for locally detecting various faults occurring during the operation of the vehicles, and a remote monitoring stations for monitoring operating status of the plurality of vehicles by collecting fault detection data detected by the fault detection means of the plurality of vehicles, wherein each vehicle comprises:

operating parameter detection means for locally sequentially detecting various types of operating parameter values which change during the operation of said vehicle;

history data update means for locally updating fault detection history data every time a fault is detected by said fault detection means during the operation of said vehicle;

transmission determination means for locally determining based on said history data and the value of the fault, whether or not to transmit to said remote monitoring stations sequential values of the operating parameters within a specified period of time around a point in time at which the fault was detected in cases where said fault was detected by said fault detentions means during the operation of said vehicle; and fault data transmission means for transmitting to said remote monitoring stations, in cases where it has been determined by said transmission determination means that a transmission should be made, a type of fault that was detected, a value detected by said operating parameter detection means at the point in time at which the fault was detected, as well as the sequential values of said operating parameters within the specified period of time around the point in time at which the fault was detected, and also for transmitting to said remote monitoring station, in cases where it as been determined by said transmission determination means that no transmission should be made, the type of fault that was detected and the value detected by said operating parameter detection means at the point in time the fault was detected; and wherein said remote monitoring station comprises:

relation data generating means for accumulating the type of fault transmitted from each vehicle and the various operating parameter values at the time the fault was detected, so as to generate data that relate the types and values of the operating parameters with the fault;

relation determination means for collating said relation data with the type of fault transmitted from said vehicle and the values of the various parameters at the time the fault was detected to determine whether or not the fault is related to the types and values of the operating parameters; and requested signal transmission means for transmitting to the vehicle, in cases where no relation was determined by said relation determination means, a signal requesting that values detected by said operating parameter detection means to be transmitted to said monitoring stations for a given period of time.

4. The vehicle fault monitoring apparatus according to claim 3, wherein said fault data transmission means searches for a frequency of the detected faults based on said history data, and transmits data indicating the fault frequency to said remote monitoring stations.

* * * * *